Patented June 16, 1936

2,044,753

UNITED STATES PATENT OFFICE 2,044,753

METHOD OF PRODUCING TITANIUM DIOXIDE

Leslie G. Jenness, Brooklyn, N. Y., assignor to Intermetal Corporation, New York, N. Y., a corporation of Delaware No Drawing. Application June 17, 1932, Serial No. 617,878

10 Claims. (Cl. 134—58)

This invention relates to the preparation of metallic oxides in a finely divided form suitable for use as pigments, catalysts, etc., and involves the production of such oxides in a substantially uniform or controlled particle size. The invention is particularly related to the production of titanium oxide, or titanium dioxide in a form eminently suitable for a number of purposes.

Titanium oxide as at present produced in commerce is composed of particles whose size varies widely in diameter. Due to this variation in particle size, the commercial product is not particularly suited for use as a pigment, as the covering power of the product is deficient. Moreover, due in part also to impurities, the product often possesses a yellow or creamy tinge which is undesirable and which has necessitated the intermixture of various color corrective additions such as phosphorus pentoxide, sulphur trioxide, fluorine, and silicon dioxide. These additions, although tending to correct the color defects are often undesirable as they react deleteriously with the chemical compounds into which the titanium oxide pigment is incorporated, or enter into a chemical combination inimical to the catalytic action desired.

One reason for the inability hitherto to produce a satisfactory titanium hydroxide or titanium oxide is ascribable to the processes by which it is produced, processes in which certain impurities have been precipitated in such a manner that it is difficult to eliminate them. For instance, a common mode of preparing this compound has been to dissolve iron-titanium ores, such as ilmenite, in strong sulphuric acid in order to obtain a mixture of titanium sulphate and iron sulphate. Titanium hydroxide is then recovered by diluting the sulphate solution and heating the same so as to hydrolyze the sulphate. This method, however, possesses the disadvantage that it requires considerable dilution in order to bring about hydrolysis and that it is difficult to remove all the undesirable metallic sulphates and sulphuric acid. Titanium oxide prepared by calcining the titanium hydroxide thus produced possesses color tones which may be undesirable for pigment purposes.

It has also been known to dissolve titanium chloride in water in order to form a mixture of titanium hydroxide and hydrochloric acid, and then to add sulphuric acid and to heat the solution to boiling in order to drive off the hydrochloric acid. This is said to leave a residue of titanium dioxide and sulphuric acid which is then calcined in order to obtain the oxide of titanium. On account of the reactions involved and the difficulty of ultimately driving off the sulphur trioxide resulting from the decomposition of sulphuric acid, it is difficult to obtain a satisfactory product by this process as impurities are carried through the liquid phase and are present in the ultimate product. As above indicated, these impurities deleteriously affect the color and covering power of the material when used as a pigment, and when used otherwise are likely to cause undesirable reactions.

In order to overcome the difficulties inherent in the established methods of preparing titanium oxides, it has been at various times proposed to carry out the reaction in the vapor phase by reducing titanium chloride to vapor form and mixing it in a closed container with air and/or steam in order to form hydrogen chloride and titanium hydroxide. This process, however, does not allow for a control of the particle size of the oxide, a large proportion of the particles being either too fine or too coarse or too variable to effect the desired covering power. As hereinafter explained, it is desirable that this particle size be controlled within fairly definite upper and lower limits in order to obtain a satisfactory product.

By the present invention I am enabled to produce a pure metallic oxide, for instance, a titanium oxide, and at the same time obtain a product having a definite range of particle sizes which renders the oxide particularly suitable for most commercial purposes. For use as a pigment, the oxide produced in such particle sizes has a maximum covering power and gives a pure white color without the necessity of intermixing color corrective impurities. In addition, the product possesses a satisfactory oil-absorbing capacity. The process of manufacture is simple and economical.

I have found that titanium oxide possesses maximum efficency as a pigment when the size of the particles ranges in the main from 0.2 to 0.4 micron in diameter. The presence of particles substantially less than 0.2 micron in diameter and substantially more than 0.4 micron in diameter considerably reduces the covering power of the oxide. It is an object of the present invention, therefore, to produce a substantially pure titanium oxide, the particles of which are substantially within this favorable range.

Without intention of limiting my invention, the same may be briefly described as comprising reacting a solution of hydrochloric acid and a metallic chloride in order to form a basic chloride of the metal, from which the oxide may be readily obtained. More particularly, the invention comprises converting a metallic chloride, for instance, titanium tetrachloride, to a basic chloride by reacting it in the liquid phase, with water, with or without the addition of hydrochloric acid but with the formation of the acid in either case. The basic chloride thus produced is readily decomposed by the method of my invention into the oxide of titanium, the particles of which are, in the main, of the desired size,—that is, a size from approximately 0.2 to 0.4 micron in diameter. In order to insure a maximum number of particles within this size range, the invention may include a further selective treatment by virtue of which excessively small or excessively large particles are eliminated from the ultimate product and recovered for subsequent reconversion into the solution from which the initial reaction progresses.

Proceeding now to a detailed description of my invention, I dissolve titanium tetrachloride in concentrated hydrochloric acid by adding the compound slowly thereto. I have found that approximately an equal volume of titanium tetrachloride is soluble in the acid. I have discovered, however, that by an addition of titanium tetrachloride to this solution after a saturated solution is attained, a plastic mass is produced with the further remarkable result that, upon a still further addition of titanium tetrachloride, the whole is converted to a dry, granular, yellow powder. During the reaction, hydrogen chloride gas is evolved. The powder produced apparently corresponds to the formula: $Ti_2(OH)_3Cl_5.2H_2O$ or an equal mixture of $Ti(OH)_2Cl_2.H_2O$ and $Ti(OH)Cl_3.H_2O$. It is very probable, therefore, that the chemical reactions taking place are as follows:

(1) $TiCl_4.3H_2O \rightarrow Ti(OH)_2Cl_2.H_2O + 2HCl$
(2) $Ti(OH)_2Cl_2.H_2O + TiCl_4 \rightarrow 2Ti(OH)Cl_3.H_2O$

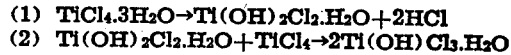

The plastic mass, therefore, is probably composed of the hydrated dibasic chloride and the reaction (1) represents its formation, hydrogen chloride gas being evolved during the reaction. As indicated in reaction (2), the powder is then formed by the further addition of titanium tetrachloride whereby it may be that about one-half of the dibasic chloride is converted to the monobasic chloride, while the other half remains as the dibasic chloride.

The next step is performed by heating the above mentioned mixture of basic chlorides gently, say at 100° C. or above, during which a ready decomposition takes place with the evolution of hydrogen chloride and the formation of titanium oxide. The reactions of this step are, therefore, probably as follows:

(3) $Ti(OH)_2Cl_2.H_2O \rightarrow TiO_2 + 2HCl + H_2O$
(4) $Ti(OH)Cl_3.H_2O \rightarrow TiO_2 + 3HCl$

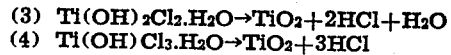

The rapidity with which the hydrogen chloride gas is given off determines the fineness of division of the resulting titanium oxide powder. This rapidity of evolution of the hydrogen chloride gas is in turn dependent upon the temperature at which the heating operation is conducted. If this temperature be 100° C., a powder of very small particle size results. However, upon a further increase of the temperature of the heating step a still smaller particle size may be obtained; so that at 200° C. or 300° C., or even considerably above those temperatures, still smaller particle sizes may be obtained corresponding with the increase of temperature. By means, therefore, of a regulation of the temperature at which the heating step is conducted, a maximum yield of titanium oxide of the desired particle size may be facilitated.

The titanium oxide is recovered quantitatively and there is, therefore, no appreciable volatilization of the basic chlorides during this operation. During reactions (1) and (2), about three-eighths of the chlorine in the titanium tetrachloride are evolved in the form of hydrogen chloride gas which is in addition to the hydrochloric acid originally present with the water during the mixing of the titanium tetrachloride and the hydrochloric acid. It should be noted that there is no appreciable heat of reaction during the mixing of the titanium tetrachloride and the hydrochloric acid and, therefore, the possibility of volatilizing titanium tetrachloride and water during this step of the process is eliminated. The other five-eighths of the chlorine originally present in the titanium tetrachloride are evolved in the form of hydrogen chloride during the heating procedure of reactions (3) and (4). In both these steps, i. e., those illustrated by all four reactions, the hydrogen chloride may be recovered in the form of hydrochloric acid, which is useful in the initial step of the process.

During the heating operation of reactions (3) and (4), the powder is converted into a fluffy white titanium oxide of many times the original volume of the powder resulting from reactions (1) and (2). This product is in finely divided form and under appropriate heat regulation possesses a generally uniform particle size approximating 0.3 micron in diameter. However, I preferably subject the product to a selective treatment by means of which the particle size of the product is controlled and the maximum number of particles of this size is obtained, as will be hereinafter explained.

I may, however, omit reaction (2) above described and heat the plastic mass resulting from reaction (1), whereupon reactions (3) and (4) take place. This procedure is, however, less desirable owing to time of heating required, and for other reasons, and I much prefer to include the step involved in reaction (2) and bring the basic chlorides into the granular condition described before carrying out the heating step of reactions (3) and (4).

The reaction during which the dibasic chloride is formed may also be carried out by dissolving the tetrachloride in water. This, however, is slightly less desirable as it requires an additional reaction involving the hydrolysis of the tetrachloride and the precipitation of titanic acid accompanied by a considerable amount of heat. Further addition of the titanium tetrachloride causes the precipitated titanium to pass back into the solution of hydrochloric acid produced during hydrolysis and from this point the same reactions take place as have been previously described. It is desirable, however, for reasons already stated, to avoid the heat resulting from this additional reaction and, therefore, it is better to add some hydrochloric acid to the water prior to the addition of the titanium tetrachloride. This causes no loss in the economic operation of the process since hydrogen chloride is recovered and is easily passed into solution for further use in the initial stages of the process.

In order to obtain even greater uniformity in the particle size of the product, that is, for instance, particles of from 0.2 to 0.4 micron in diameter, I preferably lightly grind the powder obtained as above described and place the same in suspension in water or some other suitable fluid. I then place the suspension in a settling tank and allow the larger particles to settle to the bottom, from whence they may be preferably removed for further grinding. I then place the remaining suspension in a centrifuge and centrifuge them for an appropriate period, say an hour, in order to recover the oxide particles of desired size. The residual suspension left in the vat after centrifuging may be classed as "fines" and is preferably returned to the mixing vat where it will be largely brought back into solution with hydrochloric acid for further treatment with titanium tetrachloride. The size of the particles obtained by centrifuging is substantially uniform—approximately 0.2 to 0.4 micron in diameter and the covering power of an oxide composed of these particles is considerably greater than the metallic oxides now known. In fact, I have prepared a product having a covering power of about 1500 which compares favorably with titanium oxide pigments at present on the market which range from 1000 to 1300. It should be noted, however, that commercial titanium oxide contains a number of color corrective additions and that, therefore, the calculated covering power is not, in the case of the commercial product, dependent upon the presence of the titanium oxide alone. The covering or hiding power of the titanium oxide is determined in the usual manner, that is, by preparing a tinting pigment through mixing 6 parts of precipitated calcium carbonate with 1 part of let-down lamp black, mixing the titanium oxide with an amount of tinting pigment and linseed oil rubbed for five minutes with a spatula on a ground glass plate utilizing such a quantity of oil as will give a mixture containing 80–90% by volume of oil. Basic lead carbonate pigment as a standard is prepared in the same manner. The titanium oxide is now compared with the standard pigment by placing portions of the two side by side and in contact on a microscope slide. The samples are placed upon the slide by allowing one drop of each to flow from the spatula and fall upon the slide so that the drops will flow together. This gives a uniform spread. If the titanium oxide is of lighter color than the standard, a larger amount of the lamp black is added. If darker, a lesser amount. The tinting strengths are determined by the amount of black required to give identical tints and this strength is directly proportional to the hiding power.

Instead of centrifuging, I may obtain an equally satisfactory result by allowing the suspension to settle for a longer period of time; or I may supplant the whole separation method by a Dorr classifier or by an air separation system or otherwise.

The fact that I am able to dispense with the color corrective additions is not a limitation upon my invention as I may find it desirable to utilize such additions for special purposes. So far as the process is concerned, these additions may be incorporated in the primary solution with which my process is commenced and may be carried through and precipitated with the oxides without reacting deleteriously or necessitating any change in the essential steps which I have devised.

While, also, I have endeavored to clarify the description of the invention by advancing what I believe to be the most probable and plausible theories of the chemical reactions taking place, I do not wish to be understood as limiting the actual results obtained to the various chemical formulæ so advanced.

What I claim is:

1. The method of obtaining oxide of titanium which comprises adding titanium tetrachloride to a solution of hydrochloric acid until a plastic mass is formed, and continuing the addition of titanium tetrachloride until the plastic mass is changed into a dry, granular, yellow powder; subjecting the powder to controlled temperatures until a fluffy white powder of titanium oxide is formed, and then separating the particles thereof and collecting those of the desired size.

2. The method of forming oxide of titanium which comprises adding to a solution of hydrochloric acid a quantity of titanium tetrachloride in excess of that which normally is soluble therein; subjecting the product of reaction to heat while controlling the particle size of the product by regulating said heat, and then separating undesired particle sizes and collecting the remainder.

3. The method of forming oxide of titanium which comprises adding titanium tetrachloride to a solution of hydrochloric acid and subjecting the product thus obtained to a predetermined degree of heat in order to decompose the same and form a substantially uniformly subdivided titanium oxide, and separating those particles which are not of the desired size.

4. The process which comprises first, forming a saturated solution of titanium tetrachloride in hydrochloric acid; then, by addition of more titanium tetrachloride to said saturated solution, forming a plastic mass; then, by a further addition of titanium tetrachloride, converting said plastic mass to a granular condition; and finally heating said granular material, thereby producing a finely divided titanium oxide.

5. The method of forming oxide of titanium which comprises adding titanium tetrachloride to a solution of hydrochloric acid and subjecting the product thus obtained to a predetermined degree of heat in order to decompose the same and form titanium oxide in a substantially uniform state of subdivision.

6. The method of forming oxide of titanium which comprises adding to a solution of hydrochloric acid a quantity of titanium tetrachloride in excess of that which normally is soluble therein and until a granular yellow powder is formed, and then subjecting the product of reaction to heat.

7. The method of forming oxide of titanium which includes adding to a solution of hydrochloric acid a quantity of titanium tetrachloride in excess of that which normally is soluble therein until a granular yellow powder is formed.

8. The method of making titanium oxide which comprises reacting titanium tetrachloride with hydrochloric acid in excess of that which normally is soluble therein, subjecting the reaction product to heat and then reducing the oxide so formed to a substantially uniform particle size.

9. The method of making titanium oxide which comprises adding titanium tetrachloride to water until a dry powder is produced.

10. The method of making titanium oxide which comprises adding titanium tetrachloride to water until a powder is produced and then subjecting the said powder to heat.

LESLIE G. JENNESS.